UNITED STATES PATENT OFFICE.

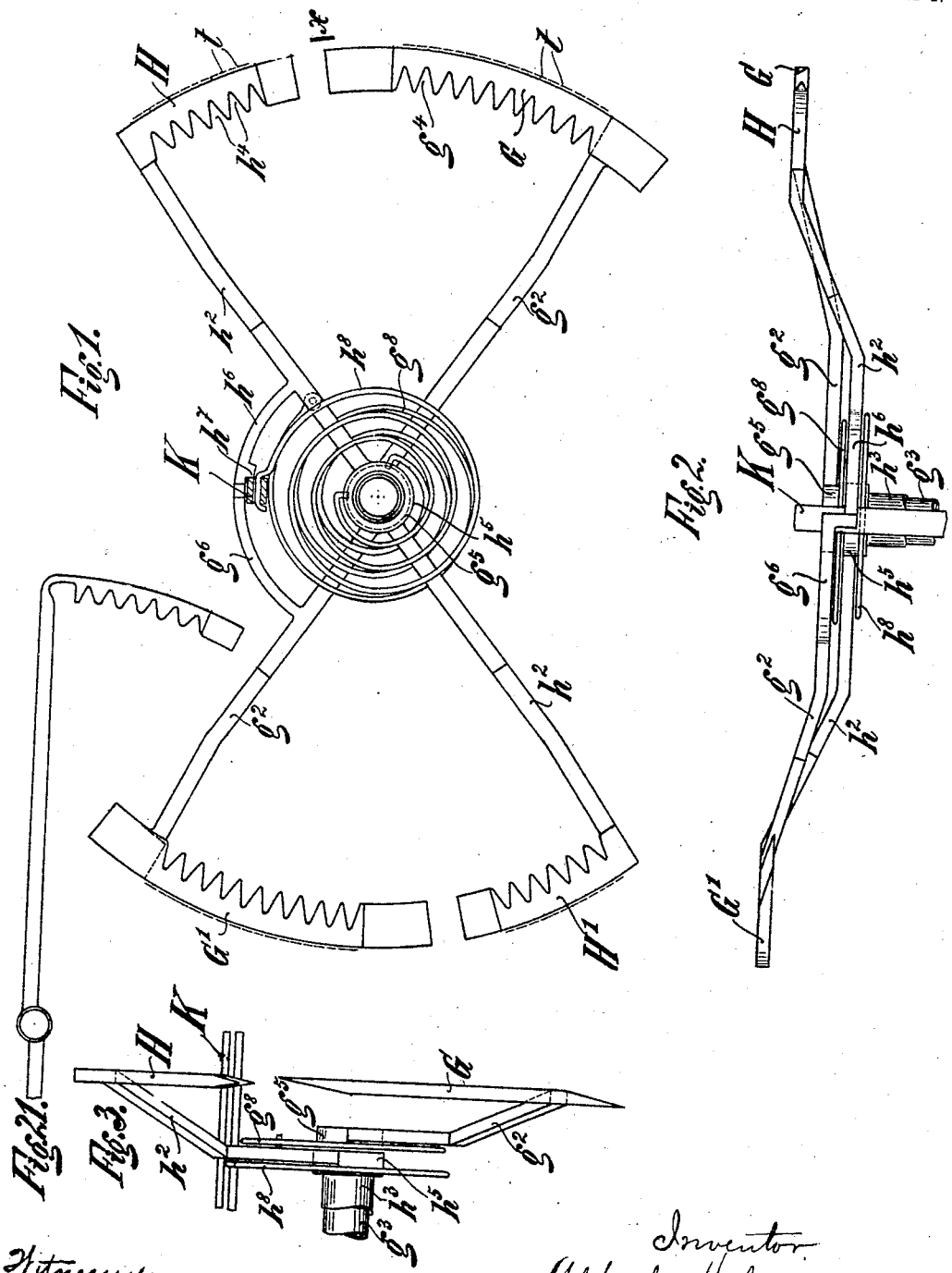

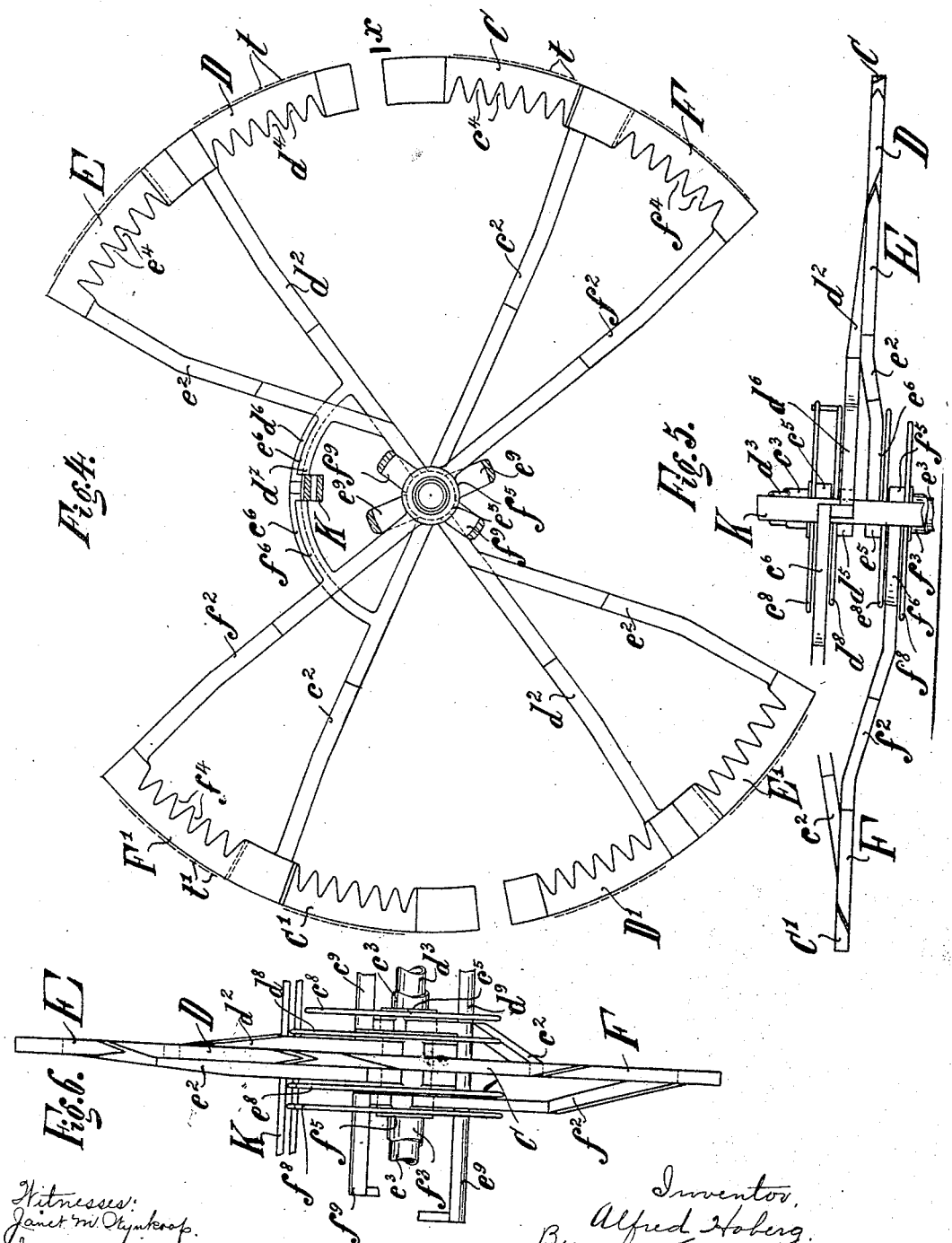

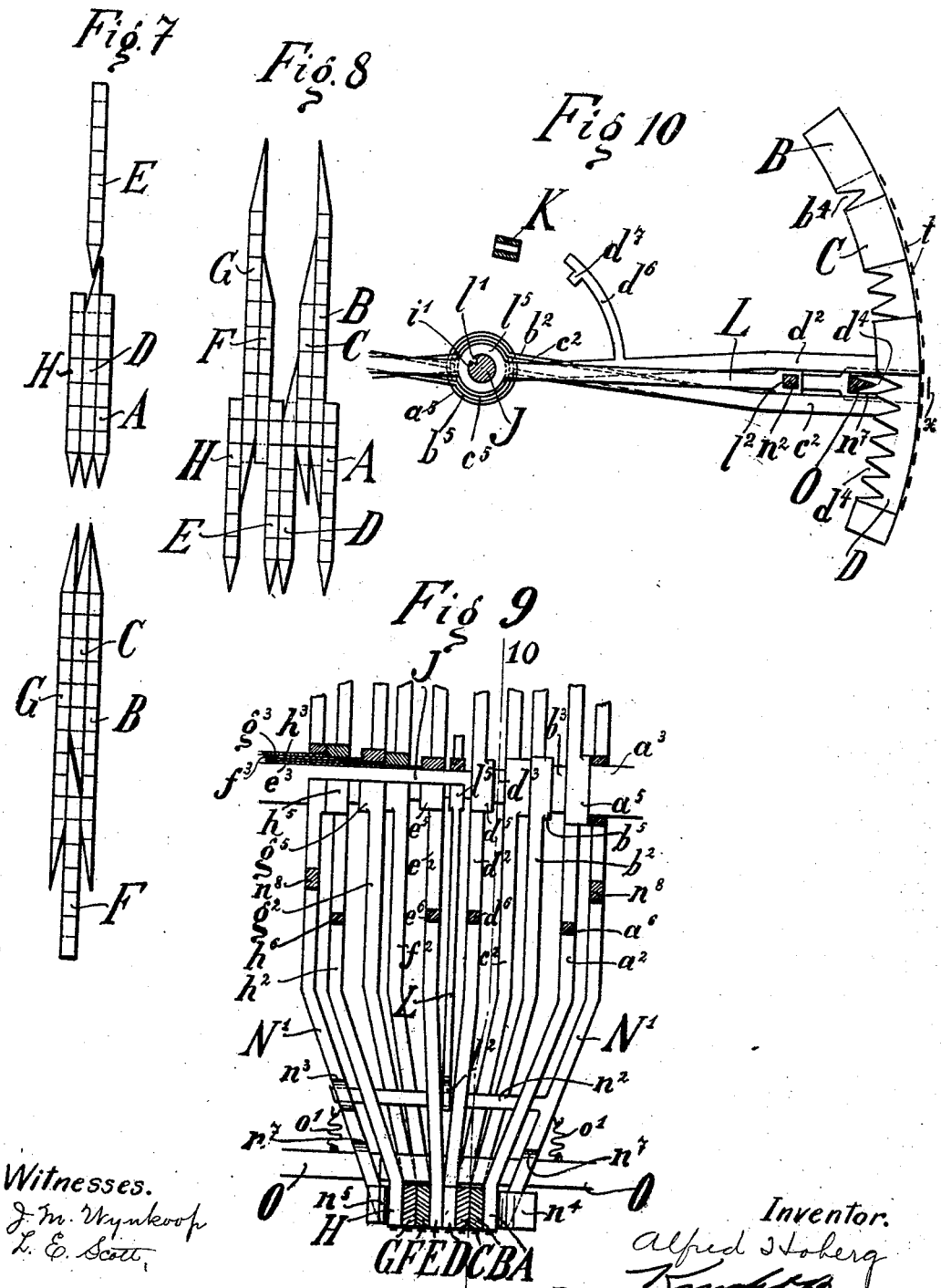

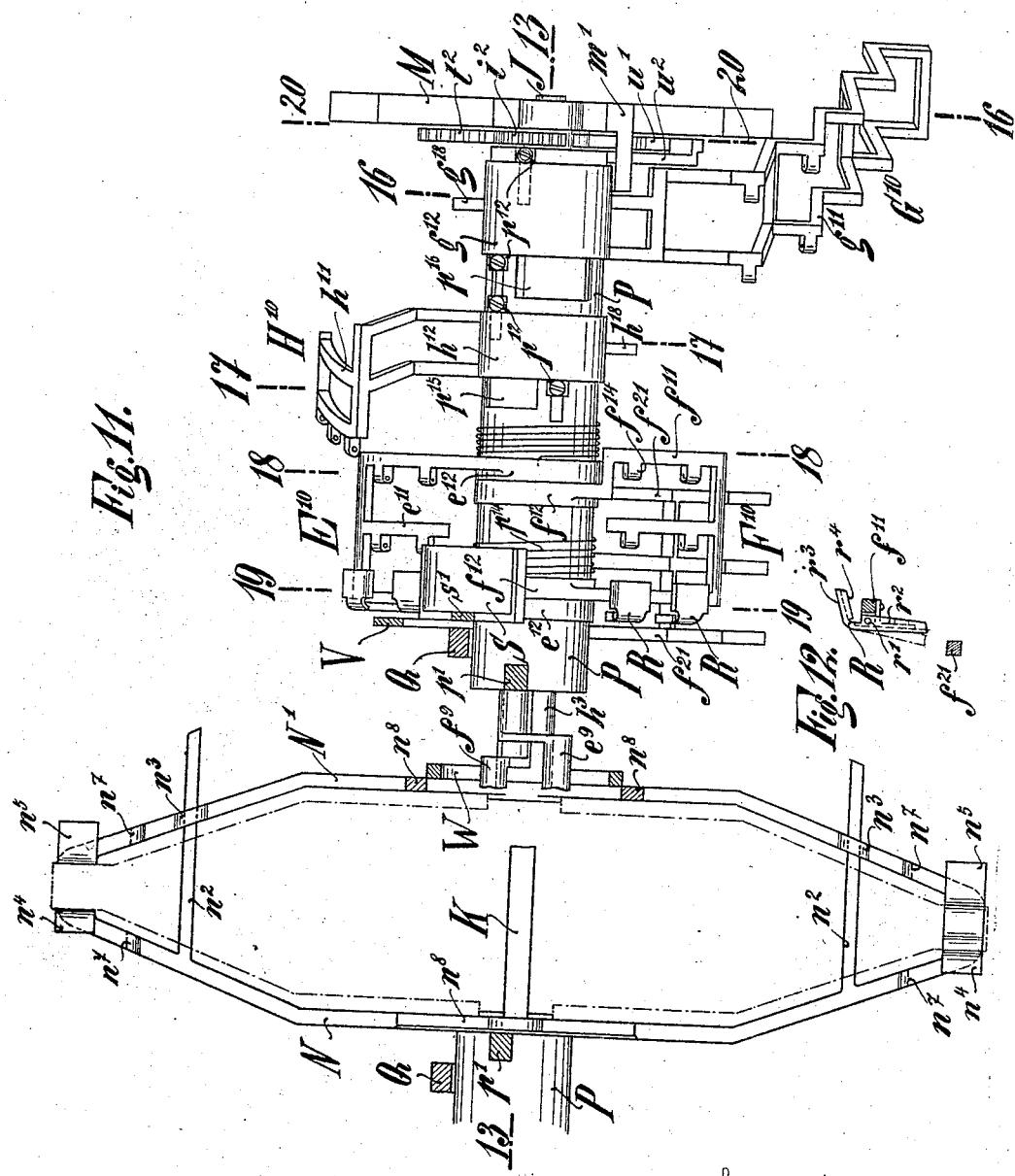

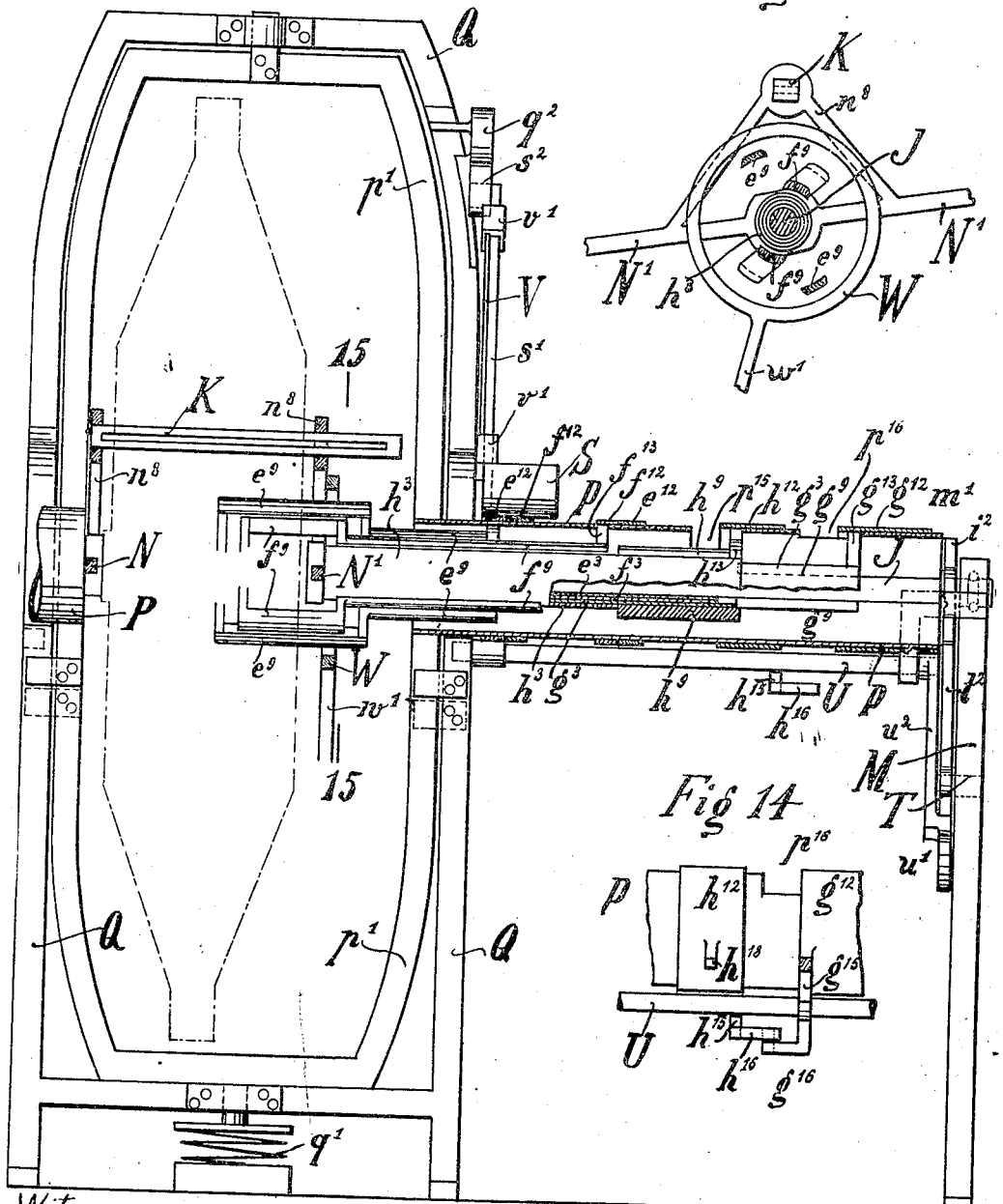

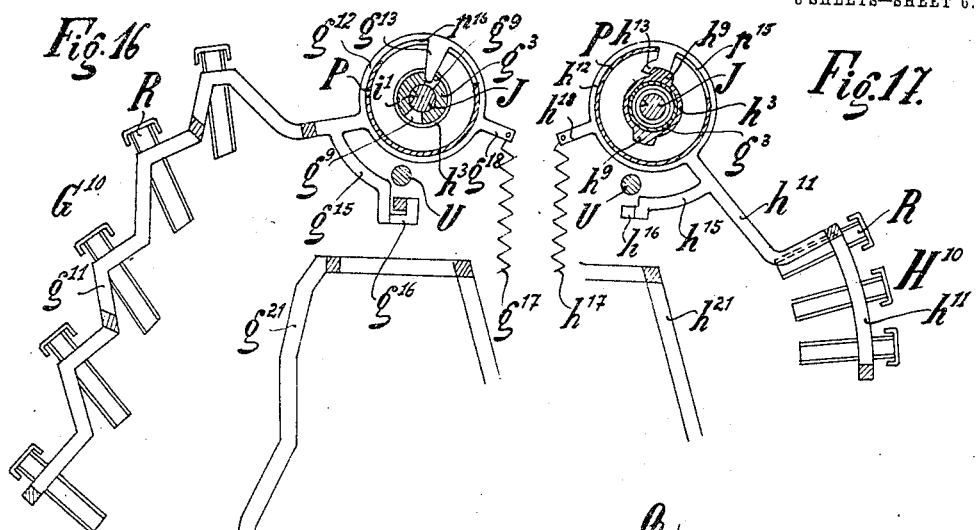

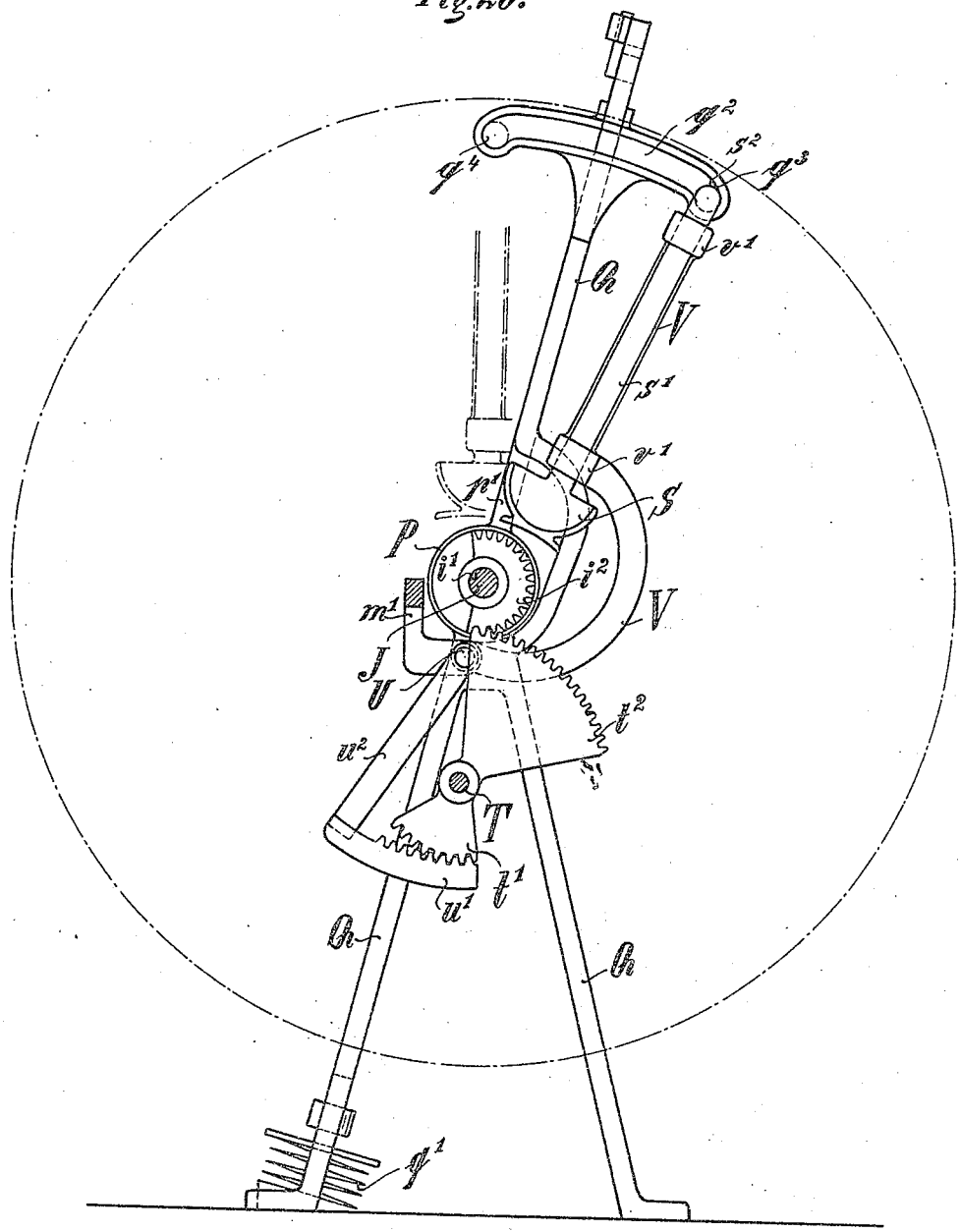

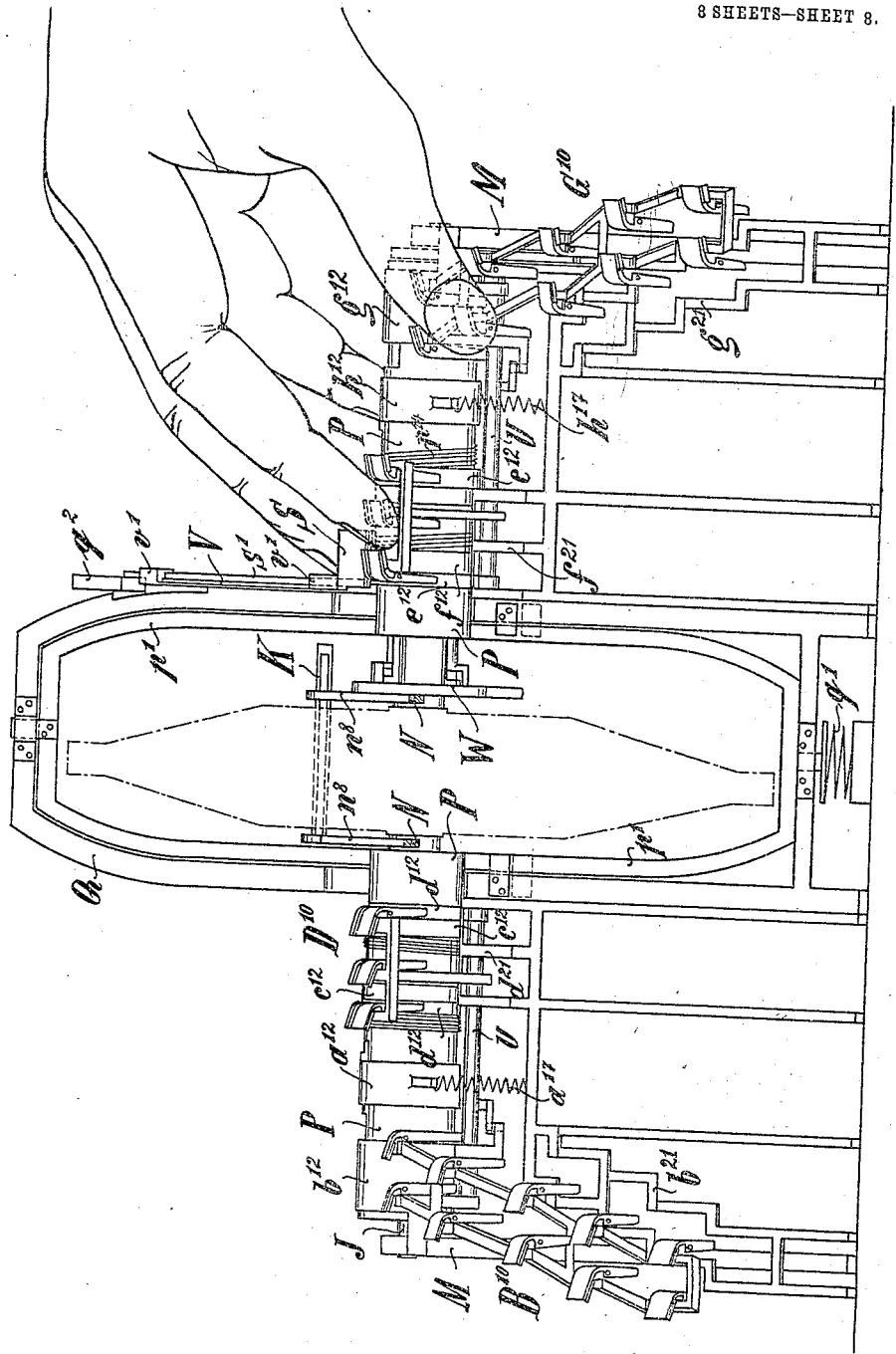

ALFRED HOBERG, OF ESSEN-ON-THE-RUHR, GERMANY.

DEVICE FOR ARRANGING TYPE.

968,766.    Specification of Letters Patent.    Patented Aug. 30, 1910.

Application filed June 18, 1908. Serial No. 439,266.

*To all whom it may concern:*

Be it known that I, ALFRED HOBERG, a subject of the Emperor of Germany, and residing at 28 Kurfürstenstrasse, Essen-on-the-Ruhr, Germany, have invented certain new and useful Improvements in Devices for Arranging Type, of which the following is a specification.

This invention relates to a device for arranging or "setting" types, matrices, punches and the like, intended for machines for producing syllable print, syllable types, syllable perforated print, and so on, in which the letters or the characters are arranged in groups on sectors. In devices of the kind referred to, it is of importance that the sectors should not be attached to a given point of the place at which the operation such as printing, casting, punching and so on is effected but that it should be possible to bring them to the different points of the operating place. It has been attempted to attain this by making rigid one of each group of three sectors arranged side by side, and the other two, on the contrary elastic. The two elastic sectors have been given a slightly inclined position relatively to the rigid sector. In that way the elastic sectors have been resiliently pressed against the rigid sector in such a way that when the latter is turned aside, the elastic sector arranged next to it, with its type rim, took the place of the type rim of the rigid sector, and the more distant elastic sector took the place of the first elastic sector. That arrangement presents the disadvantage that the type faces of the elastic sectors, when the rigid sector was not used at some point, were at an angle to the printing surface. The above disadvantage is obviated in the present invention by making the sectors laterally movable in the direction of their axis of rotation.

A constructional form of device according to this invention is illustrated by way of example in the accompanying drawing. The words "right," "left," "front" and "back" are intended with reference to an observer who is standing in front of the machine in use and looking toward the printing place. Accordingly,—Figure 1 is a side elevation of the right hand third of the type wheel, seen from the right in the position of rest. Fig. 2 is a corresponding plan. Fig. 3 is a front elevation of the half situated nearest to the printing place of the right hand third of the type wheel. Fig. 4 is a side elevation of the central third portion of the type wheel, seen from the right in the position of rest. Fig. 5 is a plan of the upper half of the central third portion. Fig. 6 is the front elevation of the half of the central third portion arranged next to the printing place. Fig. 7 is a development of the half of the complete type wheel, situated next to the printing place, in the position of rest. Fig. 8 is a development corresponding to Fig. 7 with another position of the type wheel. Fig. 9 is a horizontal cross-section through the type wheel, with the latter in the position corresponding to that shown in Fig. 8. Fig. 10 is a section on line 10—10 of Fig. 9, seen from the left. Fig. 11 is a plan of the right hand half of the machine. Fig. 12 is a side elevation of a key. Fig. 13 is a front elevation section on line 13—13 of Fig. 11. Fig. 14 is a front elevation of a portion of the parts shown in Fig. 13 in section. Fig. 15 is a section on line 15—15 of Fig. 13 seen from the right. Fig. 16 is a section on line 16—16 of Fig. 11 seen from the right. Fig. 17 is a section on line 17—17 of Fig. 11. Fig. 18 is a section on line 18—18 of Fig. 11. Fig. 19 is a section on line 19—19 of Fig. 11. Fig. 20 is a section on line 20—20 of Fig. 11, all seen from the right, with the keys left out. Fig. 21 is a side elevation of another constructional form of the type carrier or annular part, and Fig. 22 illustrates the entire machine.

The type $t$ are arranged on the cylindrical circumferences of the annular parts A A, B B, C C, etc., secured by means of rods $a^2$ $b^2$, etc., to collars $a^3$ $b^6$ of sleeve like hubs $a^3$ $b^3$. The annular parts are all of the same thickness corresponding to the width of the type, but there is no objection to the annular parts being made of different thicknesses in accordance with the different widths of the single letters, or for arranging complete prefix or suffix syllables on the annular parts. Each hub carries two such annular parts arranged diametrically opposite to each other and having exactly the same shape, the hub $a^3$ carrying the annular parts A A, the hub $b^3$ the annular parts B B, etc. It must here be pointed out that the annular parts A, B, C, which, in their position of rest, are situated at the side facing the printing place, carry the small letters and the frequently used characters or signs, while the annular parts $A^1$, $B^1$, are situated on the opposite side and carry the capital letters and the characters or signs used less often. There are altogether eight hubs of the kind, each provided with two annular parts. They form together with the annular parts belonging to them, the type wheel. Each four hubs are inserted within each other in such manner that one of them forms the spindle for the other. The hubs of the smallest diameters are mounted on the main spindle J of the machine. Starting from the center of the type wheel, four of the hubs $e^3$, $f^3$, $g^3$ $h^3$ extend to the right, and four $a^3$ $b^3$ $c^3$ $d^3$, to the left. The two groups of hubs are separated by the hub $l^5$ of a rod L which, owing to its engagement with a longitudinal groove $i^1$ of the main spindle J, by means of the nipple $l^1$, (Fig. 10), is connected to the main spindle J in a non-rotatable, but longitudinally adjustable manner. The hubs allow both of a rotating and a lateral movement of the annular parts relatively to each other. The annular parts are sharpened to a knife edge at one or both ends and provided inside with wedge-shaped notches $a^4$ $b^4$, which, as will be subsequently described, are utilized for correctly alining the type set.

The type wheel can be assumed to consist of three partial wheels. The annular parts A $A^1$, B $B^1$ form with their hubs the first partial wheel, the annular parts C $C^1$, D $D^1$, E $E^1$, F $F^1$, the second, and the annular parts G $G^1$, H $H^1$ the third partial wheel. The first partial wheel corresponds substantially with the third partial wheel. It is, therefore sufficient to describe one of them, and with reference to the illustration of the machine adopted, the third partial wheel will be described. The annular parts of the said partial wheel, in the position of rest, are in the position shown in Figs. 1–3. The annular part H is situated above and the annular part G below, the printing place marked $x$. The rods $g^2$ $h^2$ are bent in such manner that when the hubs are completely inserted within each other, that is to say, when they rest against each other, with their collars $g^5$ $h^5$, the annular parts are situated within the limiting planes of a disk of the thickness of an annular part.

The rod $h^2$ of the annular part H is provided with a projection $h^6$ bent concentrically with the main spindle and resting by means of a projection $h^7$ against a rod K parallel to the main spindle J. The said rod K, as will be hereinafter explained, is connected to the main spindle in non-rotatable manner and must be, therefore, considered as being stationary relatively to the type wheel. A spiral spring $h^8$ secured on the one hand to the collar $h^5$ and on the other hand, to a slot of the rod K, has the tendency to keep the projection $h^7$ in engagement with the rod K, and consequently the annular parts H $H^1$ in their position of rest. The connection of the spiral spring $h^8$ to the slot is so loose, that the end of the spring, with which it is secured, can move when the annular parts are moved laterally.

The rod $g^2$ of the annular parts $G^1$ is provided with a projection $g^6$ bent concentrically with the main spindle. The said projection engages with its bent free end with the projection $h^6$ of the rod H. A spiral spring $g^8$ one end of which is secured to the collar $g^5$ and the other to the rod $h^2$ of the annular part H, has the tendency to keep the projection $g^6$ and $h^6$ in engagement, and consequently the annular parts G $G^1$ in the position of rest. It is assumed that the spring $h^8$ is stronger than the spring $g^8$. Owing to the above described arrangement of springs the annular part G yields when the annular part H is brought in front of the printing place $x$. The annular part H holds, on the contrary, when the annular part G is brought in front of the printing place, its annular position relatively to the rod K, owing to the engagement of the projection $h^7$ with the said rod. Owing, however, to the shape of the faces of the annular parts which engage each other, the annular part H is moved laterally. It is, however, also possible to move the two annular parts G H simultaneously in front of the printing place. In that case the annular part H comes to rest at the right hand side of the annular part G. The collars $g^5$ $h^5$ then move away from each other to an extent equal to the thickness of an annular part.

The rotation of the annular part H is effected by means of cranks constituted by two diametrically opposite ledges $h^9$ arranged at the free end of the hub $h^3$. In the case of the annular part G, the cranks are replaced by two slots $g^9$ made in the thickened end of the hub $g^3$. The means for rotating the annular parts will be hereinafter described.

The annular parts C $C^1$, D $D^1$, E $E^1$, F $F^1$ of the central partial wheel occupy, in the position of rest, the position shown in Figs. 4–6. The annular parts D and E adjoining each other, are situated above, and the annular parts C and F in the same way below the printing place $x$. The rods $c^2$ $d^2$ $e^2$ $f^2$ are bent in such manner that when the collars $c^5$ $d^5$ $e^5$ $f^5$ of the hubs, and the hub $l^5$ of the rod L arranged in the center are resting against each other, the annular parts are situated within the limiting plane of a disk having a thickness of one annular part.

The annular parts C $C^1$ and D $D^1$ are held fast in their position of rest in the same way as the annular parts G $G^1$ and H $H^1$, by means of spiral springs $c^8$ $d^8$ which are not shown in Fig. 4, so as not to complicate the drawing. The spiral spring $d^8$ is secured on the one hand to the collar $d^5$, and on the other hand to the rod K; and the spiral spring $c^8$, on the one hand, to the collar $c^5$, and on the other hand to the arm $d^2$ of the annular part D. A projection $d^6$ of the arm $d^2$ engages by means of a projection $d^7$ with the rod K, and a projection $c^6$ of the rod $c^2$ engages with its bent free end the projection $d^6$. The annular parts E $E^1$ and F $F^1$ engage with their projections $e^6$ and $f^6$ with the rod K and are held in their position by means of spiral springs $e^8$ and $f^8$ engaging, on the one hand, with the collars $e^5$ and $f^5$, and on the other hand, with the rod K.

When the annular part D is brought in front of the printing place, the part C moves back. If the part C is brought in front of the printing place, it pushes aside the part D and, therefore, also the parts E and F. The annular part E, on being brought before the printing place, passes in front of the part D, and by means of a collar $e^5$ pushes aside the annular part F. The annular part F, on being brought in front of the printing place, passes in front of the part C. Each annular part C, D, E, F can, therefore, be brought separately with each of its type in front of the printing place. Further, all the four annular parts can be brought simultaneously in front of the printing place. The annular parts then mount on each other by means of the sharpened portions in the consecutive order determined by the engagement of the hubs with each other, namely from left to right in the order C D E F. Finally, two and three annular parts could be also brought in front of the printing place, namely C and D; C, D and E; or C, D and F.

The rotation of the annular parts E $E^1$, F $F^1$, C $C^1$, and D $D^1$ is effected by means of two cranks $e^9$ $f^9$ $c^9$ $d^9$ secured to the collars of the corresponding annular parts at two diametrically opposite points, the cranks $d^9$ and $e^9$ being capable of moving above the cranks $c^9$ and $f^9$.

To resume what has already been said with reference to the mobility of the annular parts, each of the three annular parts A B of the type wheel can be brought in front of the printing place with each of their type. In addition to that, any desired number of annular parts can be simultaneously brought in front of the printing place, some of the annular parts being left out if necessary. For instance, B can be brought in front of the printing place simultaneously with C, or with D, or with C and D, or with D and E. It is immaterial which of the annular parts to be brought in front of the printing place, is brought into that position first. The annular parts as will be subsequently explained, have to be set by striking keys, this having the advantage that it is not necessary to depress the keys in a determined sequence. For instance, a combination of annular parts is shown in Figs. 8 and 9, in which all the eight annular parts have been simultaneously brought in front of the printing place namely with those type which are situated next to the bars $a^2$ $b^2$, supporting the annular parts. All that has been said with reference to the parts C, D, E, F, applies also for the annular counter parts $C^1$, $D^1$, $E^1$, $F^1$, which can be brought in front of the printing place in the same manner after the whole type wheel, as will be subsequently explained, has been turned through an angle of 180°.

The spindle J supporting the type wheel, is supported at the ends by means of ball bearings in brackets M.

On the hubs $a^3$ and $h^3$, at both sides of the type wheel, are mounted in a loosely rotatable manner two rods N and $N^1$. The rod N is provided with two projections $n^2$ passing through eyes $n^3$ of the rod $N^1$. The rods are connected together in such manner that they cannot turn relatively to each other, but can be moved relatively to each other in the direction of the axis of rotation. In order to prevent a joint turning of the rods relatively to the main spindle J, the projections $n^2$ and eyes $l^2$ of the rod L are provided, the said rod L being non-rotatably connected to the main spindle J. The ends of the rods N and $N^1$ are provided with roof-like heads $n^4$ and $n^5$ arranged opposite each other, between which the annular parts brought in front of the printing place force themselves. The rods N and $N^1$ thus form a device for measuring the length of syllables, which is of importance, for instance, for the shifting of a paper carriage. A ring W (Figs. 13 and 15) is intended for transferring to the paper carriage the length of syllable measured by the rods N and $N^1$. The said ring is secured for the purpose to a rod $w^1$ which may be guided, for example, in the bottom plate of the machine. A spring has the tendency to move the rod $w^1$ to the left and thus to press the ring W against the measuring rod $N^1$. The ring W, controlled by the said spring, also brings together the type wheel after the annular parts have been turned back into their position of rest by their spiral springs. Near the heads $n^4$ $n^5$, the rods N $N^1$ are provided with slots $n^7$ in which are arranged wedge-shaped rods, namely, the alining rods O. They are held normally by springs $o^1$ in the position shown in Figs. 9 and 10 so that the annular parts, when being set, can freely pass in front of them. After the setting or adjustment of the annular parts, the rod O, situated at the printing place, is pushed by means of a device not shown in the drawing, into notches $a^4$ $b^4$, situated opposite the same, formed in the annular parts set or adjusted, so that the type situated in front of the printing place, are brought into a straight line. Above the main spindle J (Fig. 15) the rods N and N¹ are provided with brackets n°. In the said brackets is mounted the rod K mentioned during the description of the type wheel, the left hand end of the said rod K being secured to the bracket situated above the rod N. The bracket situated on the rod N¹ can move on the rod K. Owing to this method of mounting the rod K on the measuring bars N N¹, the said rod K, as will be readily understood, is secured to the main spindle in a non-rotatable manner.

The key board with the devices for driving the cranks is arranged on two supporting sleeves P surrounding the hubs of the annular parts and the main spindle J on the right and on the left hand sides of the type wheel. The two supporting sleeves are rigidly connected together by means of a frame $p^1$, surrounding the type wheel. The dimensions of the frame are such that the type wheel, together with the measuring rods, can freely rotate in the same and readily move in the direction of the axis. The frame is longitudinally adjustable on a fixed frame Q, to the extent which will be subsequently more fully described. A spring $q^1$ has the tendency to keep the frame $p^1$ in its highest position and the supporting sleeves P connected to the same. Owing to a trough or recess S which can receive the central finger of the hand, the frame with the supporting sleeves can be depressed into the working position illustrated in all the drawings, in opposition to the pressure of the spring $q^1$. When the frame and the supporting sleeves are in their highest position, the device for driving the crank is disengaged from the cranks of the annular parts. When the said parts are in the depressed position, the engagement is again effected (Figs. 16, 19). This adjustability of the frame and of the supporting sleeve is necessary to enable the type wheel to be turned independently of the key board to the extent of 180° when instead of annular parts A, H, the counter parts A¹, H¹ are to be brought in front of the printing place.

The device for shifting the type wheel (turning to the extent of 180°) is as follows: The main spindle J is provided, immediately next to the right hand bracket M (Figs. 11 and 13) with a toothed sector $i^2$. With the latter engages the toothed rim $t^2$ of a double sector $t^2$ $t^1$ rotatable about its pin T supported in the bracket M. The toothed rim $t^1$ of the double sector engages with a toothed rack $u^1$ rigidly connected by means of an arm $u^2$ to a spindle U parallel to the main spindle J and supported, on the one hand, in the frame Q carrying the frame $p^1$ and on the other hand, in a bracket arm $m^1$ secured to the bracket M. Close to the frame Q there is secured to the spindle U a rod V which surrounds the supporting sleeve P in an arc. Above the supporting sleeve the rod V has two bearings $v^1$ in which a rod $s^1$ provided at the bottom and with the above mentioned trough or depression S is adjustably mounted. The upper end of the rod $s^1$ is provided with a pin $s^2$ engaging with a cam groove $q^2$ secured to the frame Q. The dimensions of the cam groove and the rate of transmission between the levers and the toothed wheels, are calculated in such manner that when the rod V, owing to a lateral movement of the trough S by the middle finger introduced into it, is moved from the position shown in Fig. 20 in full lines, into the position shown in chain-dotted lines, the main spindle is rotated to the extent of 180°. Together with the main spindle, the rods N N¹ connected to the main spindle by means of the rod L, as already stated (Figs. 9 and 10) rotate. As, however, the rods N N¹ are connected to the rod K (Figs. 13 and 15) against which rest all the annular parts in the position of rest, the whole type wheel will be rotated to the extent of 180° together with the main spindle. At the ends of the cam groove $q^2$ are arranged notches $q^3$ and $q^4$. When the pin $s^2$ owing to the depression of the trough S, is brought into engagement with the said notches (which position is shown in the drawing), the supporting sleeve P will be brought into its lowest or working position, against the pressure of the spring $q$ by the foot of the trough which rests loosely on two rings $e^{12}$ $f^{12}$ surrounding the supporting sleeve.

On each supporting sleeve P are arranged four groups of keys, each of which is intended for adjusting or setting one annular part or its annular counter part. For the sake of clearness of the drawing, only the levers carrying the keys are shown. As the arrangement of keys on both supporting sleeves is practically the same, only the keys belonging to the right hand supporting sleeve and intended to be operated by the right hand, will be hereinafter described. The groups of keys arranged on the right hand side of the machine, are intended for adjusting or setting the annular parts E, F, G, H, or their counter parts E¹, F¹, G¹, H¹. The group belonging to the annular parts E E¹ is marked E¹⁰, while the group belonging to the annular parts F F¹ is marked F¹⁰. The keys of a group are always worked with one and the same finger, namely the group E¹⁰ with the third finger the group F¹⁰ by the index, the group G¹⁰ by the thumb and the group H¹⁰ by the small finger. The middle finger is placed on the before mentioned trough S and forms a support for the hand for turning the type wheel and for depressing the supporting sleeves. In arranging the keys, consideration must be paid to the length and mobility of the single fingers, therefore, the groups of keys intended for the third finger and the index, are arranged nearer to the type wheel than those intended for the thumb and for the small finger, and those intended for the small finger, are again nearer to the type wheel than those intended for the thumb. Moreover, the keyholders supporting each group of keys are curved in a cylindrical manner as shown in Figs. 16–19. The holder receiving the group of keys intended for the thumb, in addition to the curvature shown in Fig. 16, which besides is flatter than that intended for the other fingers, has also a second curvature, the shape of which can be seen in Fig. 11. The single fingers, when they are placed over the groups of keys, are approximately parallel to the main spindle J. The six keys of the group $F^{10}$, each of which corresponds to one of the six type of the annular part F or $F^1$, are mounted on a holder or support $f^{11}$ constituted by three bars and rotatably mounted on the supporting sleeve P by means of two rings $f^{12}$. The right hand ring of the holder $f^{11}$ is provided with a gripper $f^{13}$ projecting through a slot $p^{13}$ of the supporting ring P. A spring $p^{11}$ engaging on the one hand with a supporting ring $f^{12}$, and on the other hand with the supporting sleeve P, maintains the holder in the position shown in Figs. 18 and 11, in which the gripper engages with the upper end of the slot $p^{13}$. When the supporting sleeve P is depressed by the pressure of the middle finger on the trough S, the gripper $F^{11}$, is in engagement with the crank $f^9$. On the trough being released, the supporting sleeve is again raised by the pressure of the spring $q^1$, whereby the gripper is again brought out of engagement with the crank. The dimensions are calculated in such manner that the hubs with the cranks can freely rotate in the position last named, without fouling the gripper or the supporting sleeve. The keys have the shape shown in Fig. 12. They consist of a sheet metal body R bent at an obtuse angle and rotatably mounted by means of a pin $r^1$ on a projection $f^{14}$ of the key holder $f^{11}$. A spring $r^2$ holds the key in the position of rest shown in full lines in Fig. 12. When the key is depressed by placing the finger on the striking surface $r^3$ the key body is first turned to such an extent that the lugs $r^4$ come to rest on the key holder. At the same time, the bottom part of the key body comes into the position shown by chain-dotted lines in Fig. 12. If the pressure on the key is continued, the whole key holder is swung around supporting sleeve P, and turns the annular part F into the desired position by means of the gripper $f^{13}$ and the crank $f^9$. For limiting the rotary movement of the key holder, there is arranged below the same a stop frame $f^{12}$ (Figs. 18 and 11). The beams of the said stop frame are in such a position relatively to the beams of the key holder that only that key which is depressed, can strike the corresponding beam, while all the others, remaining in their position of rest, pass freely in front of the beams. The shape of the beams of the stop frame is calculated in such manner that the angle of rotation of the key holder during the depression of a key, is different, so that the type of the annular part corresponding to the depressed key, comes exactly in front of the printing place. After the release of the key, the keys return to their position of rest under the influence of the pressure of their springs $r^2$, the key holder under the influence of the spring $p^{14}$ and the annular part F under the influence of the spring $f^8$.

On the bottom side of the key holder $f^{11}$ is arranged a projection $f^{15}$ curved concentrically relatively to the supporting sleeve P, and situated below a rod U arranged in the frame of the machine (Fig. 18) when the key holder is in the position of rest, in such manner that, on the one hand, the supporting sleeve P can occupy its highest position without the projection striking the rod, and on the other hand, when the supporting sleeve is held down, the projection $f^{15}$ at once engages under the rod U when a key is depressed. The object of this arrangement is to prevent the supporting sleeves P from rising when, after the beginning of the type adjustment or setting, the middle finger is unintentionally raised from the trough.

The arrangement of the key group $E^{10}$ on a holder $e^{11}$, its movement and its action on the cranks $e^9$ or on the annular parts E $E^1$ correspond in all essential points exactly to those of the key group just described, and need not, therefore, be more fully explained.

The keys of the group $H^{10}$ are mounted on a key holder $h^{11}$ which is rotatable about a supporting ring P by means of a wide ring $h^{12}$. The ring is provided with a gripper $h^{13}$ projecting through a slot $p^{15}$ of the supporting sleeve and engaging with the cranks $h^9$ of the annular parts H and $H^1$ when the supporting sleeve is depressed. A spring $h^{17}$ engaging, on the one hand, with a projection $h^{18}$ of the ring, and on the other hand with the bed plate of the machine (Fig. 17) holds the gripper in contact with the upper end of the slot $p^{15}$ and, therefore, the key holder in its position of rest. The slot $p^{15}$ is wider than required for the movement of the gripper. The object of this arrangement is to enable the distance of the key holder $h^{11}$ from the key holders $e^{11}$ and $f^{11}$ to be modified to suit the length of the fingers of the writer. By means of the holding plates $p^{12}$ which can be screwed down in the slots of the supporting sleeve, the desired distance of the key holder from the other key holders is insured without rotatability relatively to the supporting sleeve, being affected. On the other side of the key holder is arranged a projection $h^{15}$ curved concentrically with the supporting sleeve and corresponding, as regards object and working, to the projection $f^{15}$ of the key holder $f^{11}$. The projection $h^{15}$ is provided at its free end with a lateral bend $h^{16}$, the object of which will be hereinafter explained.

The key holder $g^{11}$ of the key group $G^{10}$ is mounted on a ring $g^{12}$ projecting by means of a gripper $g^{13}$ into a slot $p^{16}$ of the supporting sleeve P and engaging, when the supporting sleeve is depressed, with the slot $g^{9}$ of the hubs of the annular supports G G¹. The gripper $g^{13}$ in the position of rest of the key holder, does not, as hitherto, come into engagement with the upper limiting surface of the slot, but can swing out to both sides from the position shown in Fig. 16. The projection $g^{15}$ secured to the bottom face of the key holder and having the same object and operation as the projections $f^{15}$ and $h^{15}$ is provided at its free end with a bend $g^{16}$ of the shape shown in Figs. 16 and 14. The bend $g^{16}$ in the position of rest of the key holder, engages with the bend $h^{16}$ of the projection $h^{15}$. A spring $g^{17}$, engaging on the one hand with a projection $g^{18}$ of the ring $g^{12}$, and on the other hand with the bed plate of the machine, has the tendency to keep the key holder in the position of rest illustrated. It is assumed that the spring $g^{17}$ is weaker than the spring $h^{17}$ which keeps the key holder $h^4$ in its position of rest. When the key holder $h^{11}$ is depressed, the key holder $g^{11}$, under the influence of the action of its spring $g^{17}$ will be rotated in the same direction to the extent of the angle of oscillation of the key holder $h^{11}$. If, on the contrary, the key holder $g^{11}$ is depressed the key holder $h^{11}$ is not affected. During the simultaneous depression of the two key holders, they do not affect each other.

The device for keeping the key holder $g^{11}$ in its position of rest, which has just been described, corresponds to the previously described coupling of the annular parts G and H, the coupling of the two annular parts resulted in the annular part G moving back when the annular part H alone was brought in front of the printing place. This naturally requires that the key holder $g^{11}$, engaging by means of its gripper with the slot $g^{9}$ of the hub $g^{3}$, should also move back when the key holder $h^{11}$ is depressed. In the latter key holder the slot $p^{16}$ for the gripper is also made wider than is required for receiving the latter. The object is again to enable the distance of the key holder from the other key holders to be adjusted to suit the length of fingers of the operator. Plates $p^{12}$ are again used for holding fast the key holder in the desired plane of rotation.

The described arrangement is primarily designed for writing machines, but it can also be employed for example, for machines for casting type, for machines for perforating paper strips which are designed for controlling type setting machines, telegraphing machines, etc.

Fig. 21 shows another construction of the type carrier. In this connection an annular part is made at the joint with the supporting bar, so thin that a slight springiness of the annular part relatively to the axis of rotation is possible. The object of this arrangement is to obviate as far as possible breakage at the joint of the annular part with the supporting bars, in case the alinement bar is accidentally impelled too forcibly into the notches of the annular part.

What I claim, is:—

1. In a machine of the character described, a plurality of sectors having groups of characters circumferentially arranged thereon and any of which sectors are adapted to be brought into the impression line by the rotation of the sectors while others of said sectors are omitted, said sectors being also movable in the direction of the axis of their rotation in order that the characters on a plurality of sectors may be simultaneously alined in the impression line.

2. In a machine of the character described, a plurality of sectors having groups of characters circumferentially arranged thereon and any of which sectors are adapted to be brought into the impression line by the rotation of the sectors while others of said sectors are omitted; said sectors being also movable in the direction of the axis of their rotation in order that the characters on a plurality of sectors may be simultaneously alined in the impression line; said sectors being arranged on opposite sides of the impression line and being brought into position by rotation in opposite directions.

3. In a machine of the character described, a plurality of sectors having groups of characters circumferentially arranged thereon and any of which sectors are adapted to be brought into the impression line by the rotation of the sectors while others of said sectors are omitted; said sectors being also movable in the direction of the axis of their rotation in order that the characters on a plurality of sectors may be simultaneously alined in the impression line; said sectors being provided with deflecting edges to cause them to be displaced in said axial direction by contacting one with another.

4. In a machine of the character described, a plurality of sectors having groups of characters circumferentially arranged thereon and any of which sectors are adapted to be brought into the impression line by the rotation of the sectors while others of said sectors are omitted; said sectors being also movable in the direction of the axis of their rotation in order that the characters on a plurality of sectors may be simultaneously alined in the impression line; said sectors being arranged on opposite sides of the impression line and being brought into position by rotation in opposite directions and said sectors being provided with deflecting edges to cause them to be displaced in said axial direction by contacting one with another and the angles of their deflecting ends being selected to determine the relative sequence in which the characters on the sectors shall be presented in the impression line.

5. In a machine of the character described, a plurality of sectors having groups of characters circumferentially arranged thereon and any of which sectors are adapted to be brought into the impression line by the rotation of the sectors while others of said sectors are omitted; said sectors being also movable in the direction of the axis of their rotation in order that the characters on a plurality of sectors may be simultaneously alined in the impression line, and said sectors adapted to be arranged in their position of rest with their types in one plane.

6. In a machine of the character described, a plurality of sectors having groups of characters circumferentially arranged thereon and any of which sectors are adapted to be brought into the impression line by the rotation of the sectors while others of said sectors are omitted; said sectors being also movable in the direction of the axis of their rotation whereby characters on a plurality of sectors may be simultaneously alined in the impression line; at least two of the sectors situated in one plane being connected together, said connecting means being such that when the second of the two coupled sectors is turned in front of the impression line the first of said two sectors takes part in said movement.

7. In a machine of the character described, a plurality of sectors having groups of characters circumferentially arranged thereon and any of which sectors are adapted to be brought into the impression line by the rotation of the sectors while others of said sectors are omitted; said sectors being also movable in the direction of the axis of their rotation whereby the characters on a plurality of sectors may simultaneously aline in the impression line, said sectors being provided with deflecting edges to cause them to be displaced in said axial direction by contacting one with another, said sectors being disposed in pairs constituting disks, the connecting means of each pair of sectors comprising a spring disposed in such manner that when the second of each pair of coupled sectors is turned in front of the impression line, the first of said pairs of sectors likewise assumes such movement.

8. In a machine of the character described, a plurality of sectors having groups of characters circumferentially arranged thereon and any of which sectors are adapted to be brought into the impression line by the rotation of the sectors while others of said sectors are omitted; said sectors being also movable in the direction of the axis of their rotation whereby the characters on a plurality of sectors may simultaneously aline in the impression line, each of said sectors constituting one or more annular parts being connected by supporting arms with a hub.

9. In a machine of the character described, a plurality of sectors having groups of characters circumferentially arranged thereon and any of which sectors are adapted to be brought into the impression line by the rotation of the sectors while others of said sectors are omitted; said sectors being also movable in the direction of the axis of their rotation whereby the characters on a plurality of sectors may simultaneously aline in the impression line, each of said sectors constituting oppositely disposed annular parts, and arms supporting said parts from a common hub.

10. In a machine of the character described, a plurality of sectors having groups of characters circumferentially arranged thereon and any of which sectors are adapted to be brought into the impression line by the rotation of the sectors while others of said sectors are omitted; said sectors being also movable in the direction of the axis of their rotation whereby the characters on a plurality of sectors may simultaneously aline in the impression line, each of said sectors comprising one or more annular parts supported on hubs, each of said annular parts having a rack portion; and an alining bar adapted to engage with said rack portion whereby to hold a plurality of sectors in alinement.

11. In a machine of the character described, a plurality of sectors having groups of characters circumferentially arranged thereon and any of which sectors are adapted to be brought into the impression line by the rotation of the sectors while others of said sectors are omitted; said sectors being mounted on a common shaft and adapted to have lateral movement thereon whereby the characters on a plurality of sectors may simultaneously aline in the impression line, and a supporting rod having connection with each of said sectors, said supporting rod being situated at a point remote from the impression line.

12. In a machine of the character described, a plurality of sectors having groups of characters circumferentially arranged thereon and any of which sectors are adapted to be brought into the impression line by the rotation of the sectors while others of said sectors are omitted; said sectors being mounted on a common shaft and adapted to have lateral movement thereon whereby the characters on a plurality of sectors may be simultaneously alined in the impression line, rods resiliently supporting said sectors whereby to permit said sectors slight movement radially to their axis of rotation.

13. In a machine of the character described, a plurality of sectors having groups of characters circumferentially arranged thereon and any of which sectors are adapted to be brought into the impression line by the rotation of the sectors while others of said sectors are omitted; and a plurality of keys for operating said sectors, said keys being arranged in banks and supported in an arcuate frame whereby the direction of movement of said keys corresponds to the natural direction of movement of the fingers of the operator.

14. In a machine of the character described, a plurality of sectors having groups of characters circumferentially arranged thereon and any of which sectors are adapted to be brought into the impression line by the rotation of the sectors, while others of said sectors are omitted; and a plurality of keys for operating said sectors, said keys being arranged in banks and supported in an arcuate frame, said frames being adjustable to compensate for the different lengths of fingers of different operators.

15. In a machine of the character described, a plurality of sectors having groups of characters circumferentially arranged thereon and any of which sectors are adapted to be brought into the impression line by the rotation of the sectors, while others of said sectors are omitted, each of said sectors comprising arcuate members mounted upon arms having a common hub, said hubs having lateral movement on a common shaft, a plurality of keys disposed in banks for operating said sectors, each of said banks of keys being mounted in a key holder, said holders having a part engaging with the sector arms and rotatably mounted on a supporting sleeve, said sleeve being adjustable relative to the arms of the sectors whereby the parts of the key holders engaging with said arms may be disengaged therefrom.

The foregoing specification signed at Dusseldorf this twenty ninth day of May, 1908.

ALFRED HOBERG.

In presence of—
PETER LIEBER,
WILHELM FLASCHE.